June 2, 1953 E. E. COMBS 2,640,888

PHONOGRAPH PICKUP

Filed Nov. 7, 1949

*INVENTOR.*
EDWARD E. COMBS

*BY*

Harry M. Saragovitz

*ATTORNEY*

Patented June 2, 1953 2,640,888

UNITED STATES PATENT OFFICE 2,640,888

PHONOGRAPH PICKUP

Edward E. Combs, Albany, Calif.

Application November 7, 1949, Serial No. 126,005

3 Claims. (Cl. 179—100.41)

Figure 1:
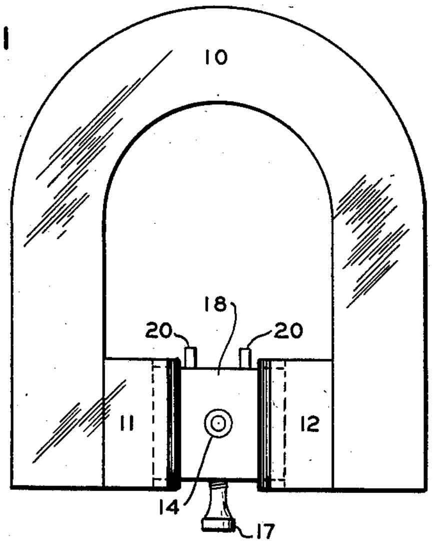

(Granted under Title 35, U. S. Code (1952), sec. 266)

The invention described herein may be manufactured and used by or for the Government for governmental purposes, without the payment of any royalty thereon.

This invention relates to electromagnetic devices and more particularly to phonograph pick-ups for use with laterally cut disc recordings. This invention is a device for generating voltage in response to and proportional to a mechanical motion such as that of a phonograph needle tracking the groove of a phonograph record.

Certain existing phonograph pick-ups of the electromagnetic type are similar in structure to a D'Arsonval type galvanometer with a phonograph needle in place of the indicating needle. In this type of pick-up, a coil is mounted on jewel, or other precise bearings, to pivot about an axis in the plane of its windings and perpendicular to magnetic lines of force. The phonograph needle is usually rigidly attached to the coil mounting and the coil is free to rotate about the axis in response to tangential mechanical pressure on the needle from the sides of the phonograph record groove. This causes the coil to cut the lines of magnetic force and produce a voltage proportional to the rotational rate of the needle.

The existing electromagnetic pick-ups of this type usually have the axial pivot mechanism in the plane of and at opposite ends of the coil, with the sections of the coil in quadrature to the pivoted ends of the coil free to cut the magnetic lines of force. The needle is mounted in the plane of this axis and perpendicular to the magnetic lines of force. A rigid ferrous section is almost invariably mounted between the magnetic poles, inside the coil, to provide a low impedance flux path between the magnetic poles, further concentrating the magnetic lines of force in the area to be traversed by the coils. This axial mounting is subject to friction if not delicately made and subject to damage or displacement by shock in any of several directions if delicately made.

It is an object of this invention to provide an electromagnetic pick-up wherein the entire center section moves with the coil of wire.

It is an object of this invention to provide an electromagnetic pick-up of the D'Arsonval type of unusually rugged construction wherein the center section forms a base for the movable coil.

It is an object of this invention to provide a phonograph pick-up of the electromagnetic type whose movable coil is not mounted on small fixed bearings.

It is an object of this invention to provide a phonograph pick-up of the moving coil type whose movable coil is mounted in a resilient bearing material between the coil and magnet.

It is a further object of this invention to provide an electromagnetic coil mounting that will withstand severe shock and that is relatively highly resistant to displacement in any direction.

According to my invention the movable member of the pick-up consists of a cylindrical form about which a coil is embedded in a continuous groove, in a plane parallel to the axis of the cylinder, so that the coil does not project from the body of the cylinder. The needle socket of the pick-up is embedded in the cylindrical form in a plane perpendicular to the plane of the coil. A permanent magnet with its pole pieces facing each other and shaped to form a cylinder larger than the cylinder just described forms the fixed member of the pick-up assembly that can be rigidly attached to the pick-up arm. The movable cylinder is mounted within the cylindrically shaped opening of the pole pieces and embedded in a resilient bearing material so that the movable cylinder is held free from any contact with the magnetic structure and rotatable about its axis within the limited arc required for this purpose.

Figure 4:
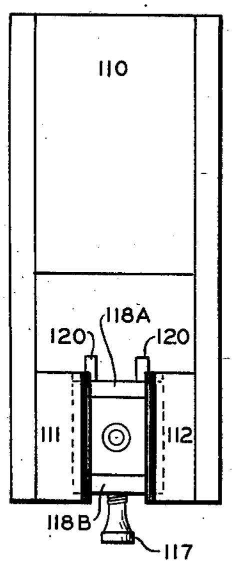
Figure 2:
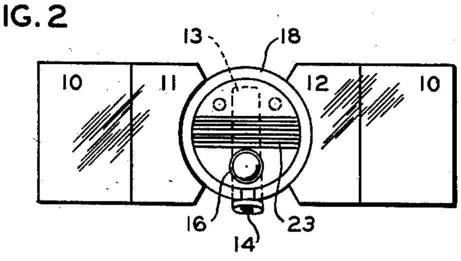
Figure 5:
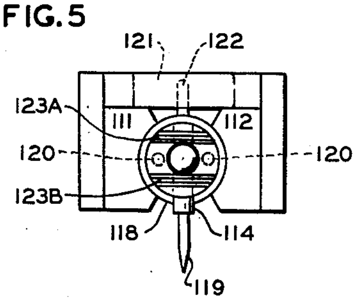
Figure 3:
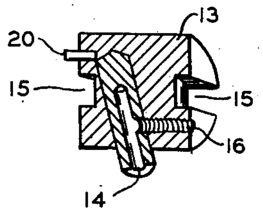
Figure 6:
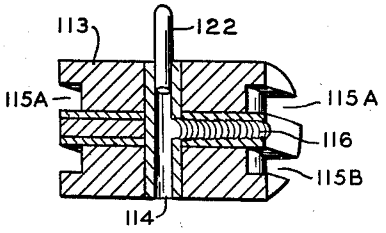

My invention will be described with reference to the accompanying drawings in which Figs. 1, 2 and 3 represent one species of the invention and Figs. 4, 5 and 6 represent the second species. Considering the pick-up assembly in playing position, Figs. 1 and 4 show the view from below, Figs. 2 and 5 show end views, and Figs. 3 and 6 are cross sections of the armature forms. Like elements are similarly numbered in all drawings.

Referring now to Fig. 1, the permanent magnet 10 is in the form of a horseshoe with two soft iron pole pieces 11 and 12 each connected at one end to a pole of the permanent magnet and with the other ends facing each other, without touching, to form a cylindrical section wherein the armature assembly 13 is contained. The spacing between 11 and 12 is such that the magnetic flux between them is fairly uniformly distributed through the cross section of the air gap. The spacing of the lower part of the gap must be sufficient to avoid contact between the pieces 11 and 12 and the needle socket 14 at its maximum deviation.

The armature 13, shown in Fig. 3, fits within the cylindrical section formed by 11 and 12 with equal spacing all around. The armature of Fig. 3 is cross sectioned to show the coil winding space 15, the general position of the needle socket 14 and the position of the threaded hole 16 for the needle set screw 17 of Fig. 1 that retains the phonograph needle in its socket, 14.

The coil 23 is wound within the coil winding space and does not project beyond the cylindrical form of the armature 13. The wire may be of any convenient size to give the desired output impedance of the pick-ups. Values from about 1 to about 1000 ohms are readily obtained.

Terminals 20 are attached to the armature to provide suitable contact points between the coil and any external connecting wire or lugs.

The armature is mounted in the cylindrical space, centered and separated from the soft iron pieces 11 and 12 by a resilient bearing material 18 that also secures the armature within this space. This material must be resilient enough to not appreciably limit the motion of the armature as the needle follows the record grooves and at the same time the material can have any desired damping effect. The material may be rubber, synthetic elastomer, or any material resilient enough to meet the above requirements. This type of mounting will withstand shock in any direction and recover itself with relatively little possibility of permanent damage.

Another species of this invention is shown in Figs. 4, 5 and 6. In Fig. 4 the magnet 110 is attached to ferrous elements 111 and 112 that form a low reluctance path to direct the magnetic flux to a cylindrical space formed where 111 and 112 face each other without contacting each other as do elements 11 and 12 of Figs. 1 and 2. The armature 113 placed in this space could be identical to the armature 13 and identically mounted, but for this species of applicant's invention, an armature is used as in Fig. 6 with two coils 123A and 123B, wound parallel to the axis of the armature, instead of one. The two coils are equidistant from and symmetric about the axis. They can be connected either in series or parallel to act as a single electrical unit.

The needle set screw may be mounted in the axis of the armature which is also the axis of rotation. The needle set screw mounting 116 which is correspondingly centered in the armature 113 may be of magnetic material so that the flux path between poles 111 and 112 will include the center shaft 116 and will be more or less radial about this shaft. This will result in a highly uniform magnetic field within the limits of the arc described by the coils. Thus, the relation between rotation of the coil and the induced currents is correspondingly linear and the harmonic distortion produced is negligible.

This type of construction permits greater mechanical as well as electrical symmetry than is found in existing electromagnetic pick-ups of this type.

The needle socket 114 in this armature can be made to extend through the armature with a projection 122 of the general shape and mass of the needle, positioned symmetrically to the needle at the opposite side of the armature. This further dynamically balances the armature. The phonograph needle may be of such conventional shape as 119 of Fig. 5.

The projection 122 may fit into a resilient damper 121 attached to the fixed section of the pick-up. This would further limit the lateral motion of the needle and armature assembly to prevent excessive rotation. The characteristic response curve of this pick-up can be to some extent altered and corrected by the choice of resilient material for this damper.

The coil terminals 120 may be mounted in any convenient place on the armature, preferably on the opposite end to the needle set screw. Two terminals are normally required, although three terminals or more could be provided for push-pull operation as well as extra terminals for various impedance outputs.

The armature 113 can be secured in the cylindrical space between poles 111 and 112 in the same manner as armature 13 is mounted between poles 11 and 12. In this case, the resilient bearing 118 may be similar to 18 of Figs. 1 and 2. However, the bands 118 A and B shown in Fig. 4, would afford greater relative resiliency while giving substantially the same support as 18 and using less material.

The foregoing disclosure illustrates the main feature of my invention. Other variations embodying standard physical and electrical details are considered within the scope of this invention.

I claim:

1. A phonograph pick-up device for use with laterally cut disc recordings, comprising: magnet means having two opposing pole pieces, each of which is adapted to receive a cylindrical element; a cylindrical non-magnetic armature positioned between said pole pieces, said armature having at least one coil thereupon wound parallel to its axis and being adapted to receive a phonograph needle projecting at right angles to said axis; cylindrical resilient bearing means coaxial with and entirely encasing said armature, said bearing means being disposed within said pole pieces and serving to support said armature as well as confine its motion to the arc of a circle and a projection of substantially the same size, shape and mass as said phonograph needle symmetrically positioned on the opposite side of said armature from said needle.

2. The device of claim 1, wherein resilient means is positioned between said pole pieces and receptive of said projection to act as a damper to motion of said armature.

3. The device of claim 1, wherein said armature has a ferrous cylindrical member positioned coaxially therein and adapted to receive means for holding said needle in position within said armature.

EDWARD E. COMBS.

References Cited in the file of this patent

UNITED STATES PATENTS

| Number | Name | Date |
|---|---|---|
| 1,781,376 | Eisenhaur | Nov. 11, 1930 |
| 1,835,073 | McClatchie | Dec. 8, 1931 |
| 1,981,793 | Keller | Nov. 20, 1934 |
| 2,148,796 | Barbieri | Feb. 28, 1939 |
| 2,290,057 | Lindenberg | July 14, 1942 |
| 2,479,894 | Andrews | Aug. 23, 1949 |
| 2,483,196 | Gordon | Sept. 27, 1949 |

FOREIGN PATENTS

| Number | Country | Date |
|---|---|---|
| 333,922 | Italy | Jan. 16, 1936 |
| 627,983 | Germany | Mar. 26, 1936 |
| 725,264 | France | Feb. 11, 1932 |